US012723401B2

(12) United States Patent
Ni et al.

(10) Patent No.: US 12,723,401 B2
(45) Date of Patent: Sep. 1, 2026

(54) FIRE-RETARDANT-TREATED WOOD COMPOSITE PANELS FOR EXTERIOR APPLICATIONS OR WEATHER EXPOSURE DURING CONSTRUCTIONS

(71) Applicant: LOUISIANA-PACIFIC CORPORATION, Nashville, TN (US)

(72) Inventors: Jianwen Ni, Franklin, TN (US); Brian St. Germain, Mt. Juliet, TN (US); Scott Johnson, Portland, OR (US); Jeffrey Yelle, Hendersonville, TN (US)

(73) Assignee: LOUISIANA-PACIFIC CORP., Nashville, TN (US)

(*) Notice: Subject to any disclaimer, the term of this patent is extended or adjusted under 35 U.S.C. 154(b) by 497 days.

(21) Appl. No.: 17/747,930

(22) Filed: May 18, 2022

(65) Prior Publication Data

US 2022/0372749 A1 Nov. 24, 2022

Related U.S. Application Data

(60) Provisional application No. 63/254,559, filed on Oct. 12, 2021, provisional application No. 63/189,725, filed on May 18, 2021.

(51) Int. Cl.

*E04B 1/94* (2006.01)
*B27N 1/00* (2006.01)

(Continued)

(52) U.S. Cl.

CPC ................ *E04B 1/942* (2013.01); *B27N 1/00* (2013.01); *B27N 3/12* (2013.01); *B27N 9/00* (2013.01);

(Continued)

(58) Field of Classification Search

CPC ... B27N 1/00; B27N 3/12; B27N 9/00; B27N 3/06; B27N 3/02; C09D 5/18;

(Continued)

(56) References Cited

U.S. PATENT DOCUMENTS 3,438,847 A 4/1969 Chase
4,661,398 A * 4/1987 Ellis ..................... C04B 41/009 428/920

(Continued)

FOREIGN PATENT DOCUMENTS

CH 3385046 A1 10/2018
CN 105984185 A 10/2016

(Continued)

OTHER PUBLICATIONS

International Search Report and Written Opinion, PCT/US22/029903, Lousiana-Pacific Corp. (international filing date May 18, 2022).

(Continued)

*Primary Examiner* — Andrew L Swanson
(74) *Attorney, Agent, or Firm* — Wayne Edward Ramage; Baker Donelson

(57) ABSTRACT

A multi-layer fire-resistance treatment (FRT) panel for use as structural sheathing. The wood structural panel may be OSB or plywood, coated or treated during the manufacturing process with a product that provides fire resistance. The treatment may be integrated with the material forming the wood structural panel, or may be a coating layer applied to the mat or mat layer. A burn-through layer also may be applied. A protective layer comprising a resin-impregnated paper overlay may be applied on one or both sides of the panel.

18 Claims, 2 Drawing Sheets

(51) Int. Cl.
*B27N 3/12* (2006.01)
*B27N 9/00* (2006.01)
*C09D 5/18* (2006.01)
*C09K 21/02* (2006.01)
*C09K 21/04* (2006.01)
*E04C 2/16* (2006.01)

(52) U.S. Cl.
CPC ................ *C09D 5/18* (2013.01); *C09K 21/02* (2013.01); *C09K 21/04* (2013.01); *E04C 2/16* (2013.01); *E04B 2103/04* (2013.01)

(58) Field of Classification Search
CPC ........ C09K 21/02; C09K 21/04; C09K 21/06; C09K 21/08; C09K 21/10; C09K 21/12; E04B 1/942; B32B 21/042; B32B 21/02; B32B 21/06; E04F 13/0864; Y10T 428/31967
See application file for complete search history.

(56) References Cited

U.S. PATENT DOCUMENTS 4,801,404 A 1/1989 Dietrich et al.
4,935,457 A 6/1990 Metzner et al.
5,723,020 A * 3/1998 Robinson .............. D21H 21/34 162/181.2
6,030,562 A 2/2000 Lehtinen et al.
6,811,731 B2 11/2004 Archer et al.
7,371,787 B2 5/2008 Preston et al.
8,642,184 B2 2/2014 Wiehn et al.
10,703,009 B2 7/2020 Freeman et al.
2003/0071389 A1 4/2003 Manning et al.
2007/0001337 A1 1/2007 Bales
2007/0278463 A1 12/2007 Ratzsch et al.
2008/0251182 A1 10/2008 Thomas et al.
2008/0264721 A1* 10/2008 Tinianov .................. E04B 1/86 181/290
2016/0024354 A1 1/2016 Winterrowd et al.
2017/0210098 A1* 7/2017 Moore .................... B32B 21/10
2018/0057139 A1 3/2018 Reddy et al.
2020/0247002 A1 8/2020 Merrick et al.
2020/0263440 A1* 8/2020 Chen ......................... B32B 9/06
2020/0270871 A1* 8/2020 Merrick .............. E04F 13/0864
2022/0098859 A1 3/2022 Johnson et al.

FOREIGN PATENT DOCUMENTS

CN 112829037 A 5/2021
DE 202012001083 U1 11/2012

OTHER PUBLICATIONS

International Search Report and Written Opinion, PCT/US23/012925, Lousiana-Pacific Corp. (international filing date Feb. 13, 2023).
International Search Report and Written Opinion, PCT/US23/010822, Lousiana-Pacific Corp. (international filing date Jan. 13, 2023).

* cited by examiner

FIRE-RETARDANT-TREATED WOOD COMPOSITE PANELS FOR EXTERIOR APPLICATIONS OR WEATHER EXPOSURE DURING CONSTRUCTIONS

This application claims benefit of and priority to U.S. Provisional Applications No. 63/189,725, filed May 18, 2021, and No. 63/254,559, filed Oct. 12, 2021, both of which are incorporated herein in their entireties by specific reference for all purposes.

FIELD OF INVENTION

This invention relates to a multi-layered structural panel (which can be wood composite or wood-based panels, such as oriented strand board (OSB), plywood, or other cellulose-based panels) used for structural sheathing or exterior applications.

BACKGROUND OF THE INVENTION

Building wall and roof assemblies are typically layers of several materials, each performing one or more specific functions, that typically are installed separately on the site in which the building is being constructed. Proper installation of the various layers individually and in combination creates challenges not only for the designer, but also for the installers.

A typical layer in most such assembles is a wood panel product, or an integral composite engineered panel product, including, but not limited to, engineered wood composite products. Wood-based composites have been found to be acceptable alternatives in most cases to dimension lumber or veneer-based wood paneling (e.g., softwood plywood). In general, wood-based composites include particle board, oriented strand board (OSB), wafer board, as well as medium density fiberboard (MDF), with the wood-based composites typically formed from a wood material combined with a thermosetting adhesive to bind the wood substrate together. Often times, the adhesive is combined with other additives to impart additional properties to the wood composites. Additives can include fire retardants, insecticides, water repellants, and preservatives. A significant advantage of wood-based composites is that they have many of the properties of plywood, but can be made from lower grade wood species and waste from other wood product production, and can be formed into panels in lengths and widths independent of size of the harvested timber.

A major reason for increased presence in the marketplace of the above-described product alternatives to dimension lumber or plywood is that these materials exhibit properties like those of the equivalent dimension lumber or plywood, especially, the properties of retaining strength, durability, stability and finish under exposure to expected environmental and use conditions. A class of alternative products are multilayer oriented wood strand boards, particularly those with a layer-to-layer oriented strand pattern, such as OSB. Oriented, multilayer wood strand boards are composed of several layers of thin wood strands, which are wood particles having a length which is several times greater than their width. These strands are formed by slicing larger wood pieces so that the fiber elements in the strands are substantially parallel to the strand length. The strands in each layer are positioned relative to each other with their length in substantial parallel orientation and extending in a direction approaching a line which is parallel to one edge of the layer. The layers are positioned relative to each other with the oriented strands of adjacent layers perpendicular, forming a layer-to-layer cross-oriented strand pattern. Oriented, multilayer wood strand boards of the above-described type, and examples of processes for pressing and production thereof, are described in detail in U.S. Pat. Nos. 3,164,511, 4,364,984, 5,435,976, 5,470,631, 5,525,394, 5,718,786, and 6,461,743, all of which are incorporated herein in their entireties by specific reference for all purposes.

Certain oriented board products can be made from flakes that are created from debarked round logs by placing the edge of a cutting knife parallel to a length of the log and the slicing thin flakes from the log. The cut flakes are subjected to forces that break the flakes into strands having a length parallel to the grain of the wood several times the width of the strand. The strands can be oriented on the board-forming machine with the strands predominantly oriented in a single (e.g., cross-machine) direction in one (e.g., core) layer and predominantly oriented in the generally perpendicular (machine) direction in adjacent layers. The various layers are bonded together by natural or synthetic resins under heat and pressure to make the finished product. Oriented, multilayer wood strand boards of the above described type are produced with bending, tensile strengths and face strengths comparable to those of commercial softwood plywood.

Building wall and roof assemblies typically are constructed by attaching several panels of the above described type as to an underlying supporting structure frame as "sheathing." These sheathing panels are often placed in a pattern forming a substantially continuous flat surface. In certain types of construction, the panels (and other construction materials) may be required under applicable building codes to meet certain fire resistance or water resistance requirements.

In prior art applications, a fire-retardant-treated (FRT) panel is installed as sheathing at a job or construction site. However, FRT lumber or plywood panels are prone to chemical leaching, and therefore need to be kept dry after installation, and otherwise withstand short-term weather exposure during construction.

Accordingly, what is needed is a wood or wood composite product panel that provides fire resistance and a protective layer to significantly reduce the leaching of fire-retardant during and after construction, without the need for a (water or weather resistant barrier) WRB system applied at the job or construction site.

BRIEF DESCRIPTION OF INVENTION

Figure 1:
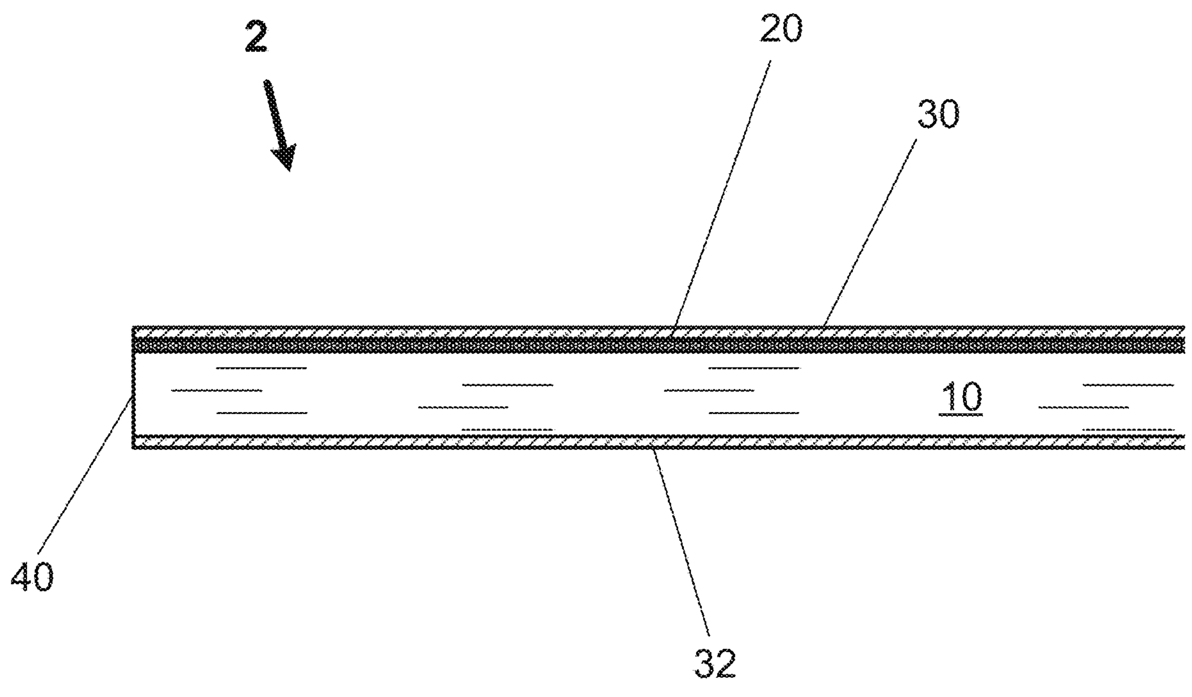
FIG. 1 shows a cross-section of a FRT panel in accordance with the present invention.
Figure 2:
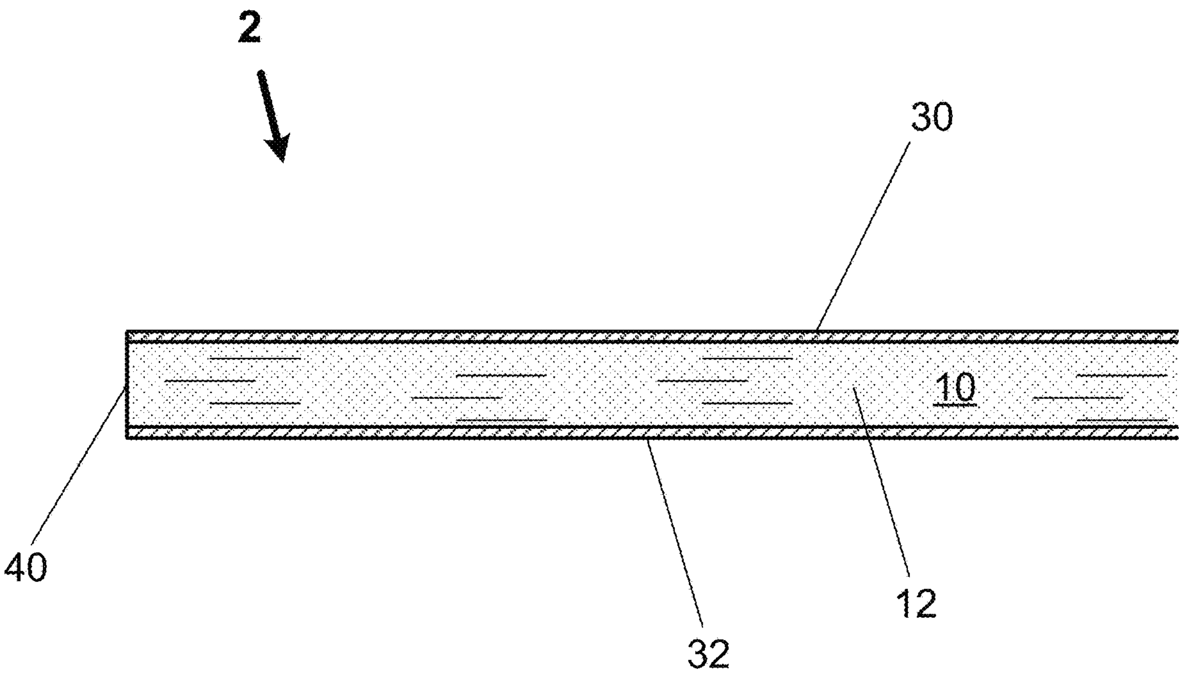
FIG. 2 shows a cross-section of another FRT panel in accordance with the present invention.

In various exemplary embodiments, the present invention comprises a multi-layer FRT panel 2 for use as structural sheathing. The multi-layer panel comprises a wood structural panel 10, such as OSB or plywood, coated or treated with a product that provides fire resistance. The treatment may be integrated 12 with the material forming the wood structural panel (as seen in FIG. 2), or may be a coating layer 20 applied to the mat or mat layer after being formed (as seen in FIG. 1). In several embodiments, the treatment gives it Fire Resistant (FR) characteristics (for use in a hour fire-resistance-rated assemblies, or where FRT wood is required by building codes).

At least one sheet of a weather-resistant overlay, e.g., a resin-impregnated paper overlay, 30 is placed as a protective layer on the top of the mat before the mat and overlay are pressed to form a FRT composite panel of the present invention. At least one sheet of overlay may also be placed underneath 32 the mat being formed, and in some embodiments, sheets of overlay are located both underneath and over the mat, thereby providing an overlay (protective layer) on both faces of the FRT composite panel.

After pressing, the FRT panel may then be primed and/or coated with a water-resistant coating. Edge sealant may be applied to the edges 40 of the panels. In an alternative embodiment, a weather-resistant or protective sheet or layer may be applied to the FRT panel in a secondary manufacturing process.

The overlay protective layer(s), as described above, helps prevent or reduce FRT chemical loss by limiting or preventing the core FRT layer(s) (in the mat or on the surface of the mat) from being exposed to water and/or weather, and by keeping or limiting FRT chemicals from leaching out of the panel.

The multi-layer panel provides a building-code-compliant product that provides structural performance and fire resistance characteristics for use in wall and roof applications that require a fire resistance performance, such as residential, single- or multi-family, and commercial construction. In one embodiment, the panel comprises an OSB sheathing panel with a FR treatment applied to the panel. The FR treatment may be applied one side of the panel, or in some embodiments, both sides of the panel. The FR treatment may comprise one or more of the following: non-combustible magnesium oxide coating; non-combustible fiberglass reinforced magnesium oxide coating; fire-resistant/resistance wood structural panel; intumescent coating; integral or surface applied chemical treatment; or combinations thereof. This FR treatment allows the panel to be used in approved hour fire-resistance-rated assemblies, or where FRT wood is required by building codes. As an alternative to FR-treated OSB sheathing panels, sheathing panels also may comprise glass mat sheathing or FRT plywood. Examples of FR-treated panels are disclosed in U.S. patent application Ser. No. 15/365,731, filed Nov. 13, 2016, and U.S. patent application Ser. No. 17/491,367, filed Sep. 30, 2021, both of which are incorporated herein in their entireties by specific reference for all purposes.

In a further exemplary embodiment, a burn-through resistant coating is applied on the surface of the FRT panel to provide burn-through resistance to addition to the flame spread resistance provided by the FRT, thereby enhancing overall performance in a fire event. The burn-through coating also helps reduce FRT leaching from the panel. The burn-through resistant coating comprises one or more of the following: non-combustible magnesium oxide coating; non-combustible fiberglass reinforced magnesium oxide coating; coating specially formulated with cement, vermiculate or other similar inorganic fire protective material; surface applied chemical treatment; and/or intumescent coating; or combinations thereof.

In contrast to the prior art, where a WRB system is separately applied to sheathing panels at the job site after installation, the present invention applies a WRB to the FR panel at the manufacturing facility, prior to shipping or installation at a job site, thereby avoiding the problems noted above with regard to prior art systems. The present invention can also be used in other exterior applications (such as, but not limited to, sidings).

Branding or markings, if any, to be applied to the panel are then applied or printed on the coated surface of the desired face, such as by using a digital printer or other stamping process. This marking also may be performed in the manufacturing line.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

The invention claimed is:

1. A method of producing a fire-resistant integrated structural sheathing panel, comprising the steps of:

producing wood strands, flakes or chips;

treating some or all of the wood strands, flakes or chips with fire-resistant chemicals or additives, or both;

forming, in a production line, a mat with one or more layers from said treated wood strands, flakes or chips, said mat comprising a top surface and bottom surface;

applying a first burn-through resistant coating layer to the top surface of the mat;

applying a first resin-impregnated paper overlay to an upper side of the burn-through resistant coating layer opposite the top surface of the mat;

applying, in said production line using a production press, heat and pressure to the mat, burn-through resistant coating and resin-impregnated paper overlay to form a board with a first surface and a second surface, wherein the first surface comprises the first burn-through resistant coating layer and the first paper overlay; and applying, after the step of applying heat and pressure, a second burn-through resistant coating on the first surface over the first paper overlay, wherein the second burn-through resistant coating comprises a magnesium oxide coating or a cement-based coating.

2. The method of claim 1, further comprising the steps of:

applying a second resin-impregnated paper overlay to the bottom surface of the mat.

3. The method of claim 1, wherein the first resin-impregnated paper overlay is configured to prevent leaching of the fire-resistant chemicals or additives from the board.

4. The method of claim 2, wherein the second resin-impregnated paper overlay is configured to prevent leaching of the fire-resistant chemicals or additives from the board.

5. The method of claim 1, wherein the fire-resistant chemicals or additives comprise one or more of a phosphate compound, a boron compound, aluminum hydrate, or amino resins.

6. The method of claim 1, wherein the burn-through resistant coating comprises one or more of a non-combustible magnesium oxide coating, non-combustible fiberglass reinforced magnesium oxide coating, or intumescent coating.

7. The method of claim 1, wherein the board is an oriented-strand board.

8. A method of producing a fire-resistant integrated structural sheathing panel, comprising the steps of:

producing wood strands, flakes or chips;

treating some or all of the wood strands, flakes or chips with chemicals or additives, or both;

forming, in a production line, a mat with one or more layers from said treated wood strands, flakes or chips, said mat comprising a top surface and bottom surface;

applying a first fire-resistant coating layer to the top surface of the mat;

applying a first burn-through resistant coating layer over the first fire-resistant coating on the top surface of the mat;

applying a first resin-impregnated paper overlay over the burn-through resistant coating layer on the top surface of the mat; and applying, in said production line using a production press, heat and pressure to the mat, first fire-resistant coating layer, first burn-through resistant coating and first resin-impregnated paper overlay to form a board with a first surface and a second surface, wherein the first surface comprises the first fire-resistant coating layer, the first burn-through resistant coating layer and the first paper overlay.

9. The method of claim 8, further comprising the steps of: applying a second resin-impregnated paper overlay to the bottom surface of the mat.

10. The method of claim 8, wherein the first resin-impregnated paper overlay is configured to prevent leaching of the fire-resistant chemicals or additives from the board.

11. The method of claim 9, wherein the second resin-impregnated paper overlay is configured to prevent leaching of the fire-resistant chemicals or additives from the board.

12. The method of claim 8, wherein the first fire resistant coating comprises one or more of a non-combustible magnesium oxide coating, non-combustible fiberglass reinforced magnesium oxide coating, or intumescent coating.

13. The method of claim 8, wherein the first burn-through resistant layer comprises one or more of a non-combustible magnesium oxide coating, non-combustible fiberglass reinforced magnesium oxide coating, or intumescent coating.

14. The method of claim 8, wherein the board is an oriented-strand board.

15. A method of producing a fire-resistant integrated structural sheathing panel, comprising the steps of:

producing wood strands, flakes or chips;

treating some or all of the wood strands, flakes or chips with fire-resistant chemicals or additives, or both;

forming, in a production line, a mat with one or more layers from said treated wood strands, flakes or chips, said mat comprising a top surface and bottom surface;

applying a first weather-resistant overlay to the top surface of the mat;

applying, in said production line using a production press, heat and pressure to the mat, burn-through resistant coating and resin-impregnated paper overlay to form a board with a first surface and second surface;

after the step of applying heat and pressure, applying a first fire-resistant coating layer to the first surface of the board.

16. The method of claim 15, wherein the first weather-resistant overlay is a resin-impregnated paper overlay.

17. The method of claim 15, first fire resistant coating comprises one or more of a non-combustible magnesium oxide coating, non-combustible fiberglass reinforced magnesium oxide coating, or intumescent coating.

18. The method of claim 15, wherein the board is an oriented-strand board.

* * * * *